United States Patent
Boyette

(10) Patent No.: US 11,375,700 B2
(45) Date of Patent: Jul. 5, 2022

(54) ON-LINE FISHING BAIT HOLDER

(71) Applicant: Ronald Boyette, Kenly, NC (US)

(72) Inventor: Ronald Boyette, Kenly, NC (US)

( * ) Notice: Subject to any disclaimer, the term of this patent is extended or adjusted under 35 U.S.C. 154(b) by 174 days.

(21) Appl. No.: 16/861,467

(22) Filed: Apr. 29, 2020

(65) Prior Publication Data
US 2021/0337778 A1 Nov. 4, 2021

(51) Int. Cl.
*A01K 85/01* (2006.01)
*A01K 97/04* (2006.01)

(52) U.S. Cl.
CPC .............. *A01K 85/01* (2013.01); *A01K 97/04* (2013.01)

(58) Field of Classification Search
CPC ......... A01K 85/01; A01K 97/04; A01K 97/02
USPC .............. 43/44.99, 42.06, 43.1, 44.87, 44.92
See application file for complete search history.

(56) References Cited

U.S. PATENT DOCUMENTS

| | | | |
|---|---|---|---|
| 2,478,621 A | 8/1949 | Attula | |
| 2,844,907 A | 7/1958 | Merton | |
| D217,663 S | 5/1970 | Chamberlain | |
| 3,974,591 A | 8/1976 | Ray | |
| 5,038,513 A * | 8/1991 | Hardin | A01K 85/01 43/44.8 |
| D345,779 S | 4/1994 | Baggett et al. | |
| 5,617,669 A * | 4/1997 | Levey | A01K 97/02 43/44.99 |
| 6,625,920 B1 | 9/2003 | Rockwell | |
| 7,503,141 B1 * | 3/2009 | Leeman | A01K 97/02 43/44.99 |
| 9,392,780 B1 * | 7/2016 | Boyette | A01K 95/00 |
| D786,391 S | 5/2017 | Phelps et al. | |
| D807,470 S | 1/2018 | Lewis et al. | |
| D858,687 S | 9/2019 | LaRoy | |
| 2009/0255164 A1 * | 10/2009 | Jones | A01K 97/02 43/4.5 |
| 2010/0000142 A1 * | 1/2010 | Thompson | A01K 97/02 43/4.5 |
| 2014/0053448 A1 | 2/2014 | Kapolnek | |
| 2015/0075057 A1 | 3/2015 | Korunsky | |
| 2021/0120795 A1 * | 4/2021 | James | A01K 91/04 |

FOREIGN PATENT DOCUMENTS

| | | |
|---|---|---|
| GB | 2092873 A | 8/1982 |
| GB | 2215171 A | 9/1989 |
| GB | 2226743 A | 7/1990 |

OTHER PUBLICATIONS

Jandell, Chum Dispenser, Retrieved from the internet: URL: https://www.cabelas.com/shop/en/jandell-chum-dispenser [retrieved on Oct. 12, 2021]; p. 1.

* cited by examiner

*Primary Examiner* — Timothy D Collins
*Assistant Examiner* — Maria E Graber
(74) *Attorney, Agent, or Firm* — Coats & Bennett, PLLC

(57) ABSTRACT

A bait holder to be attached to a fishing line and hold bait attractor. The bait holder is constructed from first and second sections. The sections attach together to form an enclosed interior space to hold the bait attractor. Connector sections on each of the sections provide for attaching the sections individually to the fishing lines. The connector sections align together in the closed configuration to form a receptacle to secure the fishing line.

17 Claims, 9 Drawing Sheets

ON-LINE FISHING BAIT HOLDER

BACKGROUND

To increase the chances of catching a fish, attractor bait is used in the vicinity of the hook. The attractor bait releases into the water and attracts the fish through their sense of smell. With the fish are attracted, they are likely to eat the bait or artificial lure that is with the hook and be caught.

Various types of attractor bait can be used to attract fish. One type of attractor bait includes chum which can include various materials, such as but not limited to fish parts, bone, and blood that has been ground into a paste-like consistency. Attractor bait can also be artificial, such as the various products sold under the name BERKLEY GULP available from Pure Fishing, Inc.

Holders have been designed to contain the attractor bait while in the water. The holders have an interior space that contains the attractor. An issue with the holders is they require the person to thread the fishing line through the holder. Therefore, a person who is fishing is required to cut their fishing line, thread the line through the holder, and then retie the hook or lure back to the end of their line. This is a tedious task of cutting and retying that is not favored by persons. Further, this process may be required each time new attractor bait is placed into the holder.

Another issue is keeping the holder securely attached to the fishing line. While fishing, the person frequently casts their line out into the water, retrieves the line, and then recasts into the water. This process can repeat many times during a fishing excursion. The force exerted during the casting and retrieving process often causes the holder to detach from the fishing line. When this occurs, the holder is usually lost as it sinks to the bottom or floats away.

SUMMARY

One aspect is directed to a bait holder configured to be attached to fishing line, The bait holder comprises first and second sections each comprising: a cup-shaped body with a closed end and an open end; and a connector section comprising a hook that extends outward from an outer side of the body with a slot formed between the hook and the outer side and with the slot comprising an opening at an end of the hook with the opening sized to receive the fishing line. The first and second sections are configured to connect together with the open ends aligned together and forming an enclosed interior space within the bodies, and with the connector sections aligned together to form an enclosed receptacle to receive the fishing line. The first and second sections comprise identical shapes and sizes.

In another aspect, the connector sections of the first and second sections are aligned within different planes that are parallel to each other and perpendicular to a longitudinal axis that extends through the enclosed interior space and the closed ends.

In another aspect, each of the first and second sections further comprises an edge at the open end with the edge comprising one or more extensions and one or more pockets with the one or more extensions of each of the first and second sections sized to fit within the one or more pockets of the other of the first and second sections.

In another aspect, the edge comprises a stepped section and a recessed section that are aligned on different planes along a longitudinal axis that extends through the interior space with the one or more extensions positioned on one of the stepped section and the recessed section and the one or more pockets positioned on the other of the stepped section and the recessed section.

In another aspect, each of the connector sections comprises a post that extends outward from the outer side of the body in proximity to the hook, the post being spaced away from the end of the hook by a gap that is sized to receive the fishing line.

In another aspect, the first and second connector sections are first connector sections, and further comprising a second connector sections positioned on an opposing side of the first and second sections, the second connector sections being identical to the first connector sections.

In another aspect, each of the first and second sections comprise openings in the closed end.

One aspect is directed to a bait holder configured to be attached to fishing line. The bait holder comprises a body comprising side walls and end walls that extend around and form an enclosed interior space with the body comprising a longitudinal axis that extends through the interior space and the end walls. First and second connectors extend outward from the side walls and are each configured to connect to the fishing line with each of the first and second connectors comprising: a first hook with a first opening that extends into a first slot; a second hook with a second opening that extends into a second slot; and with the first and second hooks aligned in opposing directions with the first opening and the second opening facing in different directions and with the first and second slots aligned to form a receptacle to contain the fishing line. The body comprises first and second sections with each of the first and second sections comprising one-half of the body and one-half of the first and second connectors. The first and second sections comprising a common shape and size.

In another aspect, the first and second hooks are aligned in a side-by-side position along the longitudinal axis.

In another aspect, the first and second connectors are positioned on opposing sides of the body.

In another aspect, each of the first and second connectors further comprise a first post positioned at the first hook and a second position positioned at the second hook with each of the first and second posts are spaced away from the respective first and second hooks by a gap.

In another aspect, the body comprises a cylindrical shape with the end walls being rounded and with openings positioned in the end walls that lead into the interior space.

In another aspect, a centerline C/L is perpendicular to the longitudinal axis, and one of the first and second hooks of each of the connectors extends from the body on a first side of the centerline and the other of the first and second hooks extends from the body on an opposing second side of the centerline.

In another aspect, the body and the connectors are symmetrical about the centerline.

One aspect is directed to a method of using a bait holder on a fishing line. The method comprises: attaching a first section of the bait holder to the fishing line by inserting the fishing line into a first gap formed between a first hook and a first post on the first section of the bait holder and moving the fishing line into a first slot formed underneath the first hook; attaching a second section of the bait holder to the fishing line by inserting the fishing line into a second gap formed between a second hook and a second post on the second section of the bait holder and moving the fishing line into a second slot formed underneath the second hook; moving each of the first and second sections along the fishing line and forming an enclosed interior space with the first and second sections; and aligning the first hook and the second hook together in a side-by-side alignment along the fishing line and forming an enclosed receptacle that contains the fishing line.

In another aspect, the method comprises positioning the interior space away from the fishing line with the fishing line attached on an outer side of the interior space.

In another aspect, the method comprises overlapping the first and second sections and forming the enclosed interior space and the enclosed receptacle.

In another aspect, the method comprises aligning a longitudinal axis of the bait holder along the fishing line.

In another aspect, the method comprises positioning bait within at least one of the first and second sections prior to forming the enclosed interior space.

In another aspect, the method comprises abutting together edges of the first and second sections and forming the enclosed interior space.

The various aspects of the various embodiments may be used alone or in any combination, as is desired.

DETAILED DESCRIPTION

Figure 1:
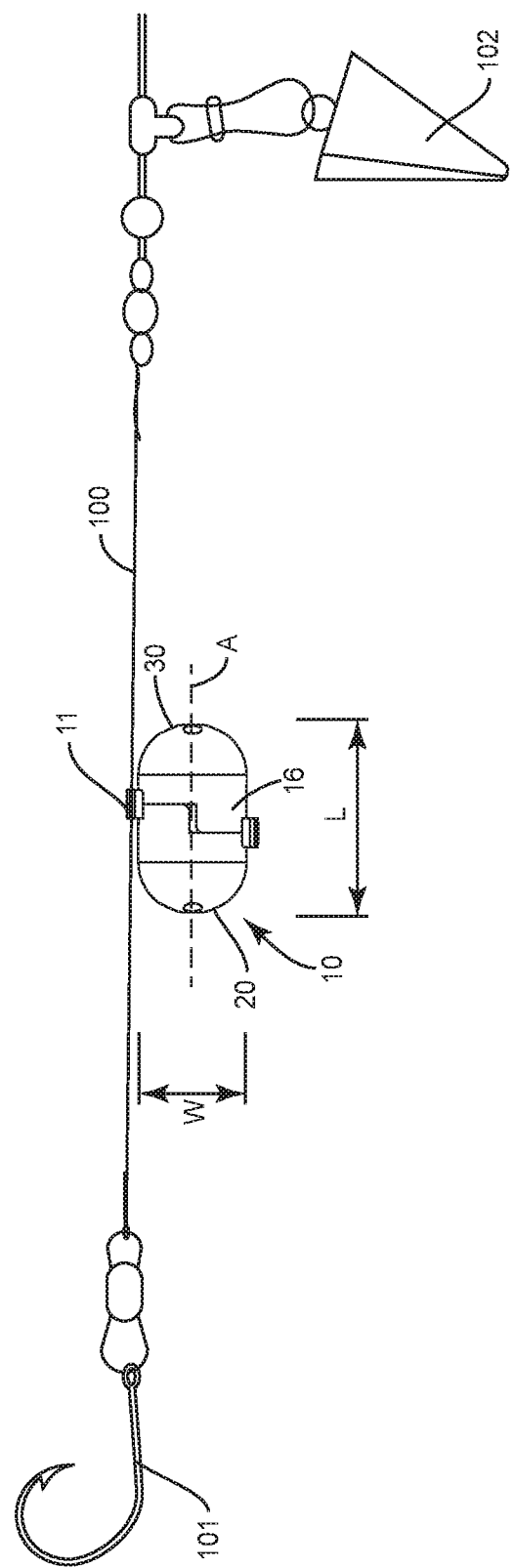
FIG. 1 is a side view of a bait holder attached to a fishing line.

FIG. 1 illustrates a bait holder 10 attached to a fishing line 100. The bait holder 10 includes a main body 16 with a hollow interior space configured to hold the attractor bait that releases a smell to attract fish. The bait holder 10 further includes a connector 11 that extends outward from the main body 16 to connect to the fishing line 100. The connector 11 is positioned on one side of the main body 16 such that the fishing line 100 does not extend through the interior space that holds the attractor bait. The bait holder 10 is constructed from first and second sections 20, 30 that attach to the fishing line 100 without requiring cutting the line for attachment. Therefore, the bait holder 10 can be attached to a fishing line 100, such as between a hook 101 and weight 102 as illustrated in FIG. 1, without having to cut the fishing line 100.

Figure 2:
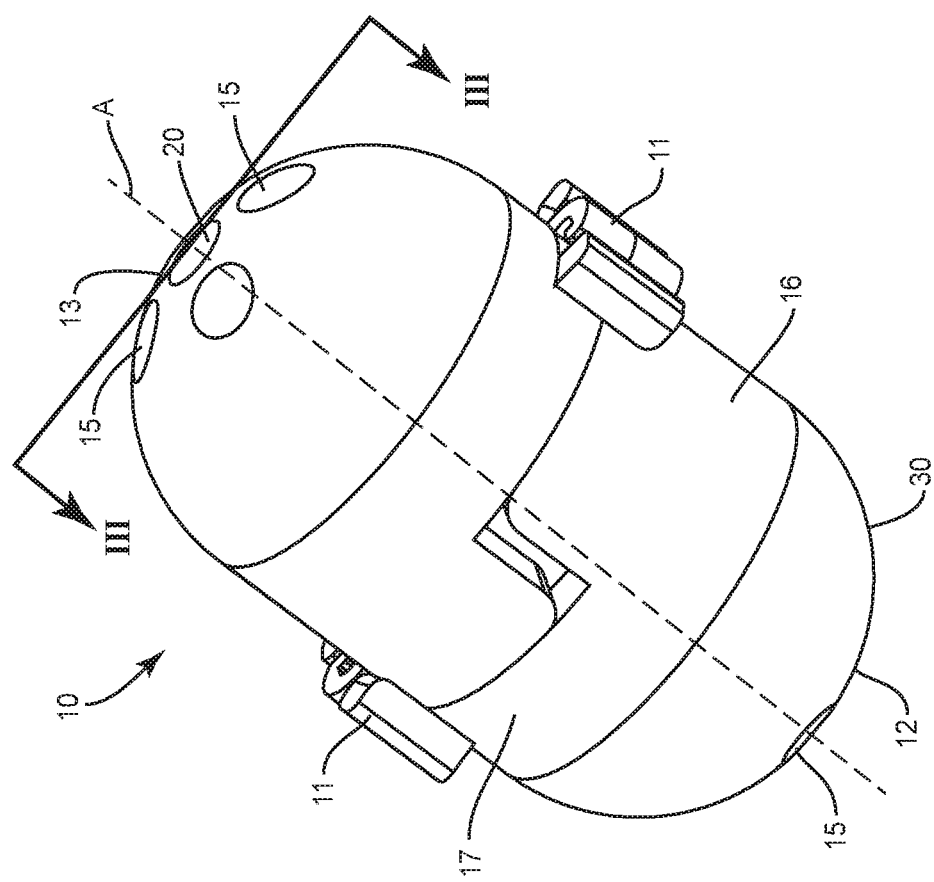
FIG. 2 is a perspective view of a bait holder.
Figure 3:
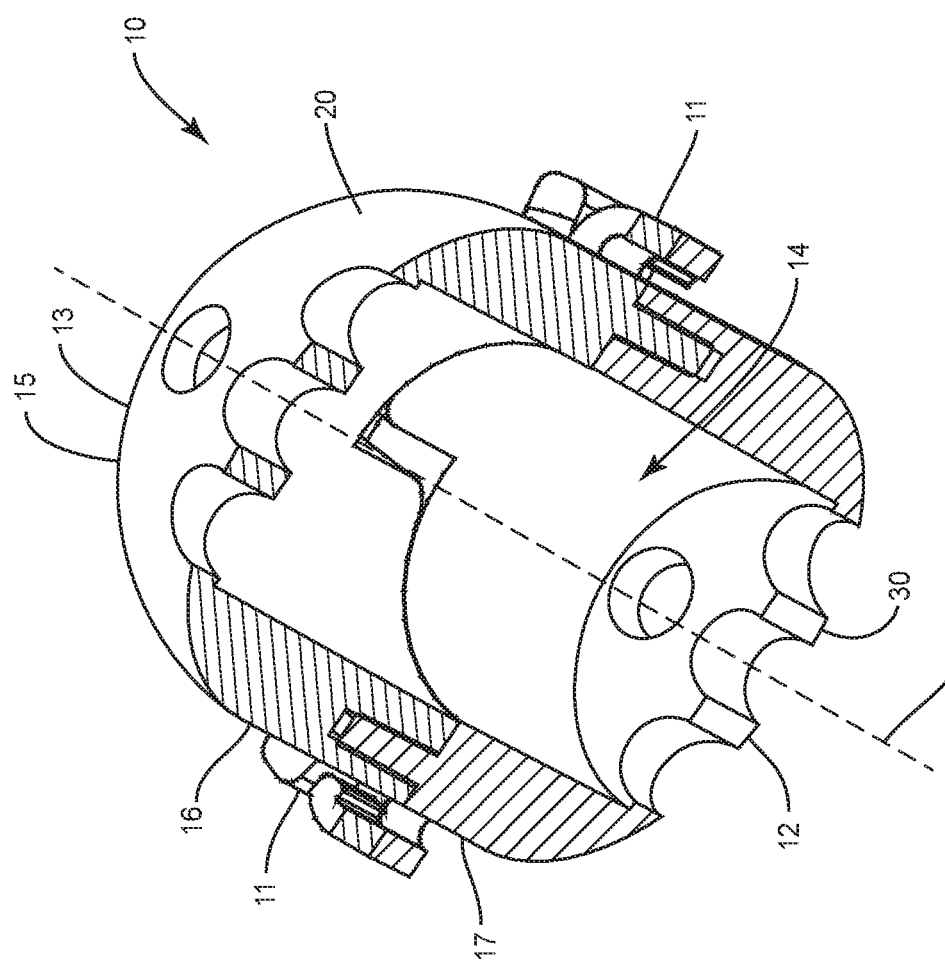
FIG. 3 is a section view of the bait holder of FIG. 2 cut along line III-Ill.

FIGS. 2 and 3 illustrate the bait holder 10 in a closed configuration with first and second sections 20, 30 positioned together. The bait holder 10 includes a generally cylindrical shape with side walls 17 rounded end walls 12, 13. The rounded end walls 12, 13 reduce the drag of the bait holder 10 in the water. This facilitates its use in moving water (e.g., current in a river, moving water in the surf). The rounded ends 12, 13 further reduce the drag when the bait holder 10 is being reeled in through the water by the user, such as when finished fishing or to add new attractor bait.

A longitudinal axis A extends through the bait holder 10 and each of the ends 12, 13. The length of the bait holder 10 measured between the ends 12, 13 and along the longitudinal axis A can vary. In one example, the length is about 1 inch. The width measure perpendicular to the longitudinal axis C/L can also vary with one specific example including a width of about 0.75 inches.

The bait holder 10 includes one or more connectors 11 for attaching to the fishing line 100. The connectors 11 extend outward from the side walls 17. In the example of FIGS. 2 and 3, the bait holder 10 includes a pair of connectors 11 positioned on opposing sides of the main body 16. Another example includes a single connector 11. In another example, the connectors 11 extend outward from the end walls 12, 13. Other examples include three or more connectors 11 that extend outward from the main body 16. As previously disclosed, the connectors 11 are exposed on the exterior of the main body 16. The fishing line 100 can be threaded into the connectors 11 without requiring cutting of the fishing line 100 or otherwise threaded the line through an interior space 14 within the main body 16.

An enclosed interior space 14 is formed within the main body 16 and is configured to contain the attractor bait. One or more openings 15 lead into the interior space 14 for water to move through the interior space 14 and allow the smell of the attractor bait to flow out and thus attract fish.

Figure 4:
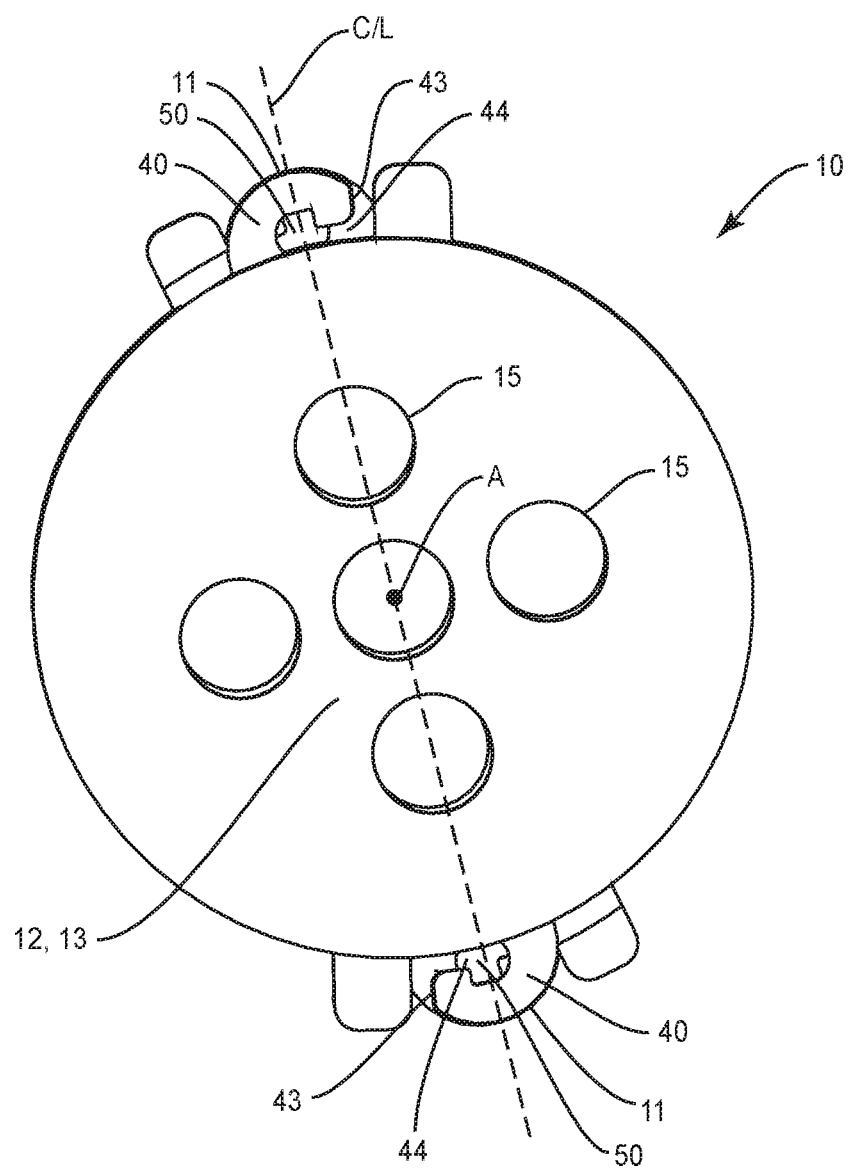
FIG. 4 is an end view of a bait holder

FIG. 4 illustrates an end view of the bait holder 10. A centerline C/L extends through the bait holder 10 and is perpendicular to the longitudinal axis A. In the example of FIG. 4, the bait holder 10 includes a circular section shape cut across the longitudinal axis A. As illustrated in FIG. 1, the bait holder 10 includes a length L measured along the longitudinal axis A that is greater than the width W measured along the centerline C/L. This provides a torpedo shape that facilitates movement through the water and reduces the drag in the water.

The bait holder 10 includes the first and second sections 20, 30 that mate together. In one example, the first and second sections 20, 30 are identical. This reduces the number of parts for manufacturing and inventory as two of the same part mate together to form the bait holder 10. This construction provides for one-half of the main body 16 and one of the connectors 11 to be formed by each of the sections 20, 30. In another example, the connector sections 11a, 11b and body sections include a common shape and size, although there may be other differences with the sections 20, 30.

Figure 5:
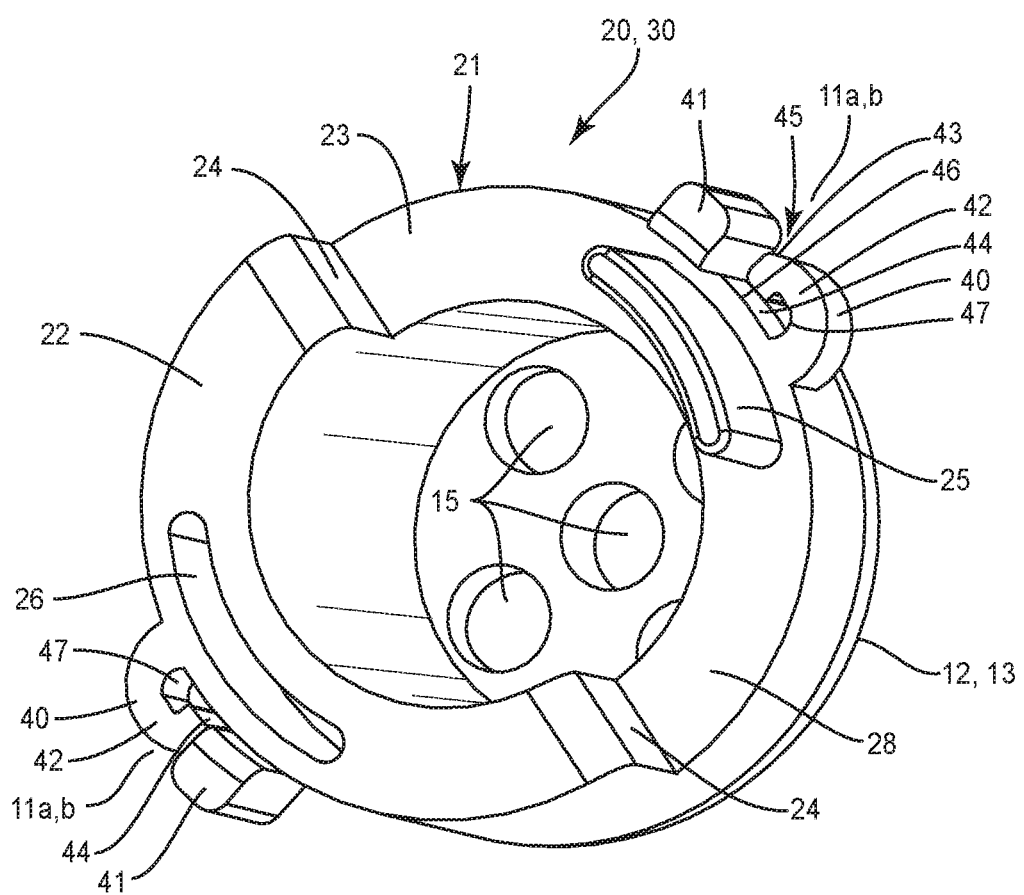
FIG. 5 is a perspective view of an inside of one of the first and second sections.

FIG. 5 illustrates one of the first and second sections 20, 30. The sections 20, 30 include a cup shape that includes the end wall 12, 13, and an opposing open end 21. The open end 21 includes an edge 28 with a stepped section 22 and a recessed section 23. In one example, each of the stepped section 22 and recessed section 23 lie in planes that are spaced apart. In one example, the planes are parallel and perpendicular to the longitudinal axis A. In another example, the planes are non-parallel. The edge 28 also includes ledges 24 that extend between the stepped section 22 and the recessed section 23.

An extension 25 extends outward from one of the recessed section 23 and stepped section 22, and a corresponding pocket 26 extends into the other section 22, 23. FIG. 5 includes the extension 25 on the recessed section 23 and the pocket 26 in the stepped section 22. The extension 25 and pocket 26 include complementary shapes and sizes to mate together when the first and second sections 20, 30 are attached together. In the example of FIG. 5, the design includes a single extension 25 that mates with a single pocket 26. In other examples, the sections 20, 30 include two or more extensions 25 that mate with two or more pockets 26. The extension 25 is sized to frictionally fit within the pocket 26 and prevent detachment.

The combination of one or more of the stepped section 22, recessed section 23, ledges 24, extension 25, and pocket 26 securely attach the first and second sections 20, 30 together in an overlapping configuration. The extension 25 frictionally fits into and contacts against the pocket 26. The shapes of the components further prevent the first and second sections 20, 30 from rotating relative to each other.

Figure 6:
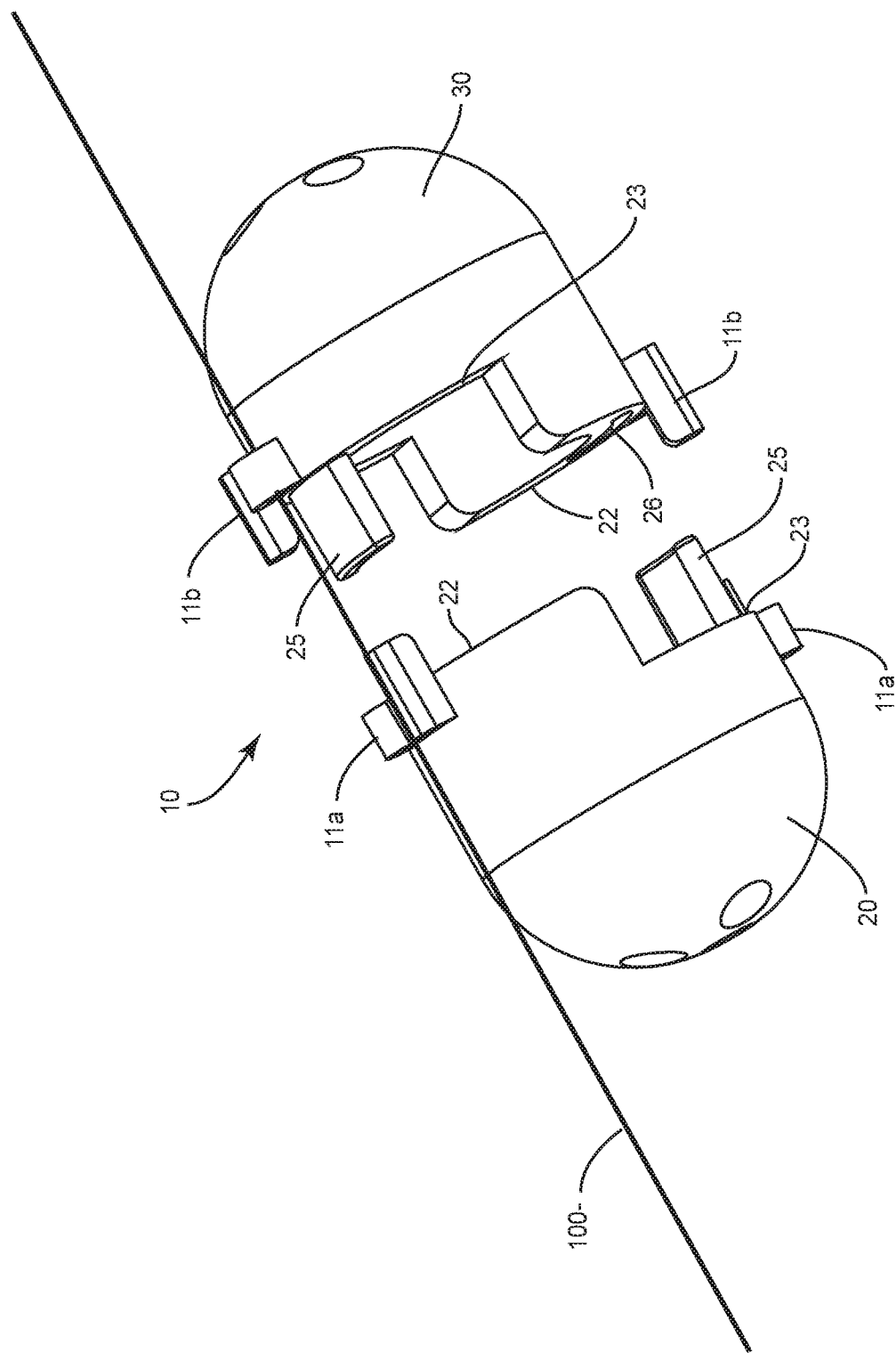
FIG. 6 is a perspective view of first and second sections in an open configuration and each attached to the fishing line.

FIG. 6 illustrates the bait holder 10 in an open configuration with the first and second sections 20, 30 each attached to the fishing line 100 and separated apart. Because of the symmetrical shape of the two identical sections 20, 30, the corresponding mating features align together. The extension 25 and pocket 26 on the first section 20 align with the corresponding extension 25 and pocket 26 on the second section 30. The shape and size of the stepped sections 22 correspond to and mate with the recessed sections 23 on the two sections 20, 30.

Figure 7:
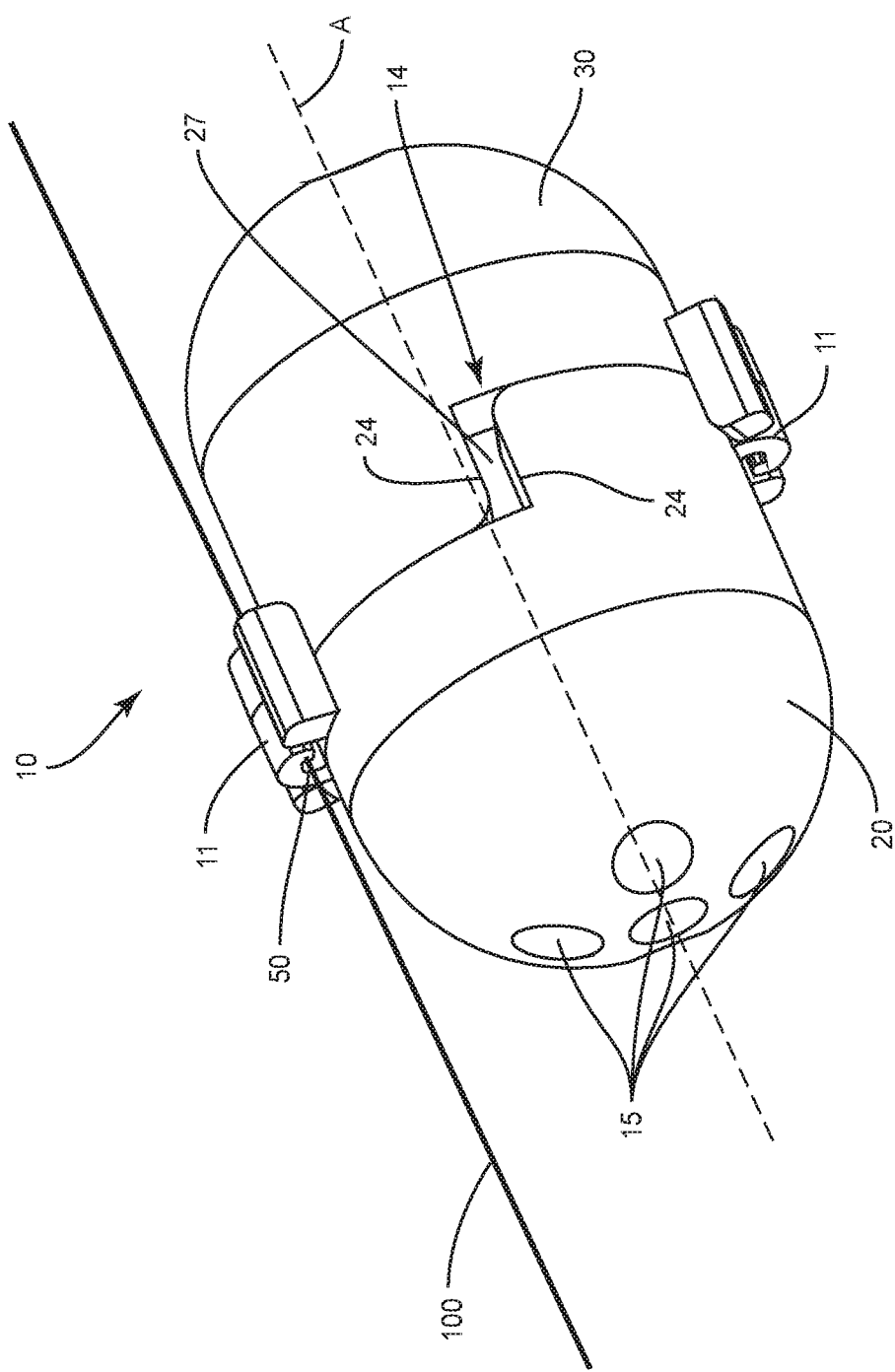
FIG. 7 is a perspective view of a bait holder in a closed configuration and attached to the fishing line.

FIG. 7 illustrates the bait holder 10 attached to the fishing line 100 and in the closed configuration. The first and second sections 20, 30 are mated together to form the enclosed interior space 14 that contains the attractor bait. In the example of FIG. 7, a gap 27 is formed between the ledges 24 (a corresponding gap 27 may also be formed on the opposing side of the bait holder 10). The gap 27 allows for water to pass into and from the interior space 14, yet is small enough to prevent escape of the attractor bait. In one example, the gap 27 includes at least one dimension that is smaller than that of the openings 15.

In one example, the edges 28 of the first and second sections 20, 30 abut together in the closed configuration. In another example, the edges 28 are spaced a small distance apart with a gap formed between the edges 28 that provides for water flow but is small enough to prevent escape of the bait attractor.

Each of the connectors 11 is formed by a first connector section 11a on the first section 20 and a second connector section 11b on the second section 30. The first and second connector sections 11a, 11b act in concert to form the connector 11 and secure the bait holder 10 to the fishing line 100. As illustrated in FIG. 5, each connector section 11a, 11b includes a hook 40 and a post 41. The hook 40 includes a curved body 42 that extends outward from the respective section 20, 30. The body 42 includes an exposed end 43. A slot 44 is formed between the body 42 and the respective section 20, 30. The slot 44 can include various shapes depending upon the shape of the body 42. In one example as illustrated in FIG. 5, the slot 44 includes a relatively narrow neck 46 at the end 43 and wider back 47 where the body 42 extends from the section 20, 30.

The post 41 extends outward from the section 20, 30 in proximity to the hook 40. A gap 45 is formed between the end 43 of the body 42 and the post 41 and is in communication with the slot 44. The gap 45 includes a width that is greater than the fishing line 100 to allow the fishing line 100 to be inserted into the gap 45 and then moved into the slot 44.

Figure 8:
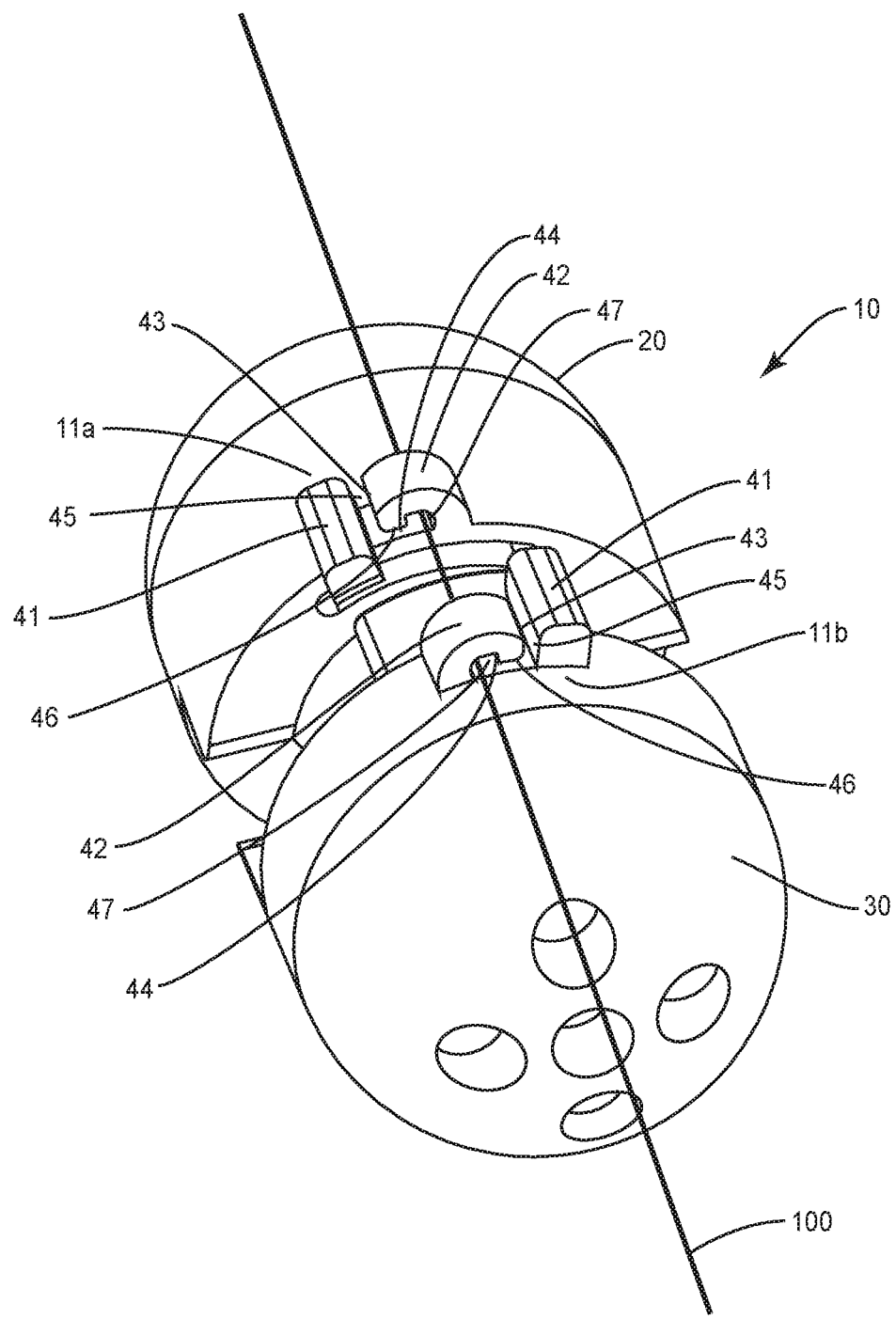
FIG. 8 is a perspective view of first and second sections in an open configuration and each attached to the fishing line.

FIG. 8 illustrates connector sections 11a, 11b of each of the first and second sections 20, 30 connected to the fishing line 100. The fishing line 100 is positioned in the back 47 of the slot 44. The relatively narrow neck 46 prevents and/or reduces the likelihood that the fishing line 100 inadvertently moves out of the slot 44 causing the section 20, 30 to disconnect from the fishing line 100. The back 47 is larger than the fishing line 100 to provide for the section 20, 30 to move along the length of the fishing line 100 as necessary. With the sections 20, 30 separated as illustrated in FIG. 8, attractor bait can be placed in the interior space 14.

In one example, each section 20, 30 is individually attached to the fishing line 100 as illustrated in FIG. 8. Once attached, the sections 20, 30 are mated together to the closed configuration as illustrated in FIG. 7. Moving the sections 20, 30 to the closed configuration provides for the connector sections 11a, 11b to be positioned to prevent detachment from the fishing line 100. The connector sections 11a, 11b are positioned in a side-by-side arrangement along the longitudinal axis A. In one example, the hooks 40 abut together. In another example, the hooks 40 are separated by a small amount.

As illustrated in FIGS. 4 and 7, the slots 44 aligned together and form a single receptacle 50 that contains the fishing line 100. The receptacle 50 is enclosed by the two hooks 40. A first hook 40 of the first connector section 11a is aligned in a first direction and the second hook 40 of the second connector section 11b is aligned in an opposing section direction. This positioning provides for the receptacle 50 to enclose the fishing line 100. As illustrated in FIG. 4, the base of each hook 40 aligns longitudinally with the end 43 of the other hook 40.

To remove the bait holder 10 from the fishing line 100, the two sections 20, 30 are moved apart to along the length of the fishing line 100. To remove a section 20, 30 from the fishing line 100, the fishing line 100 is moved out of the slot 44 and into the gap 45 formed between the hook 40 and the post 41. The fishing line 100 is then moved through the gap 45 to remove the section 20, 30.

In one example, the first and second sections 20, 30 are identical. Each of the sections 20, 30 includes a pair of connector sections (i.e., first section 20 includes two connector sections 11a and second section 30 includes two connector sections 11b). During use, one pair of the connectors sections 11a, 11b align and form a connector 11 that attaches to the fishing line 100. The second pair of connector sections 11a, 11b align and form a second connector 11 that is not used with the fishing line 100. Further, as illustrated in FIG. 2, the first connector 11 and the second connector 11 are aligned at different locations long the longitudinal axis A.

In one example as illustrated in FIG. 5, the extension 25 and pocket 26 are aligned with the connector sections 11a, 11b. In the example of FIG. 5, the extension 25 is positioned directly below the connector section 11a, 11b. Likewise, the receptacle 26 is positioned directly below the connector section 11a, 11b. When the bait holder 10 is in the closed configuration, the positioning of the extensions 25 and receptacles 26 relative to the connector sections 11a, 11b can strengthen the connector 11.

Figure 9:
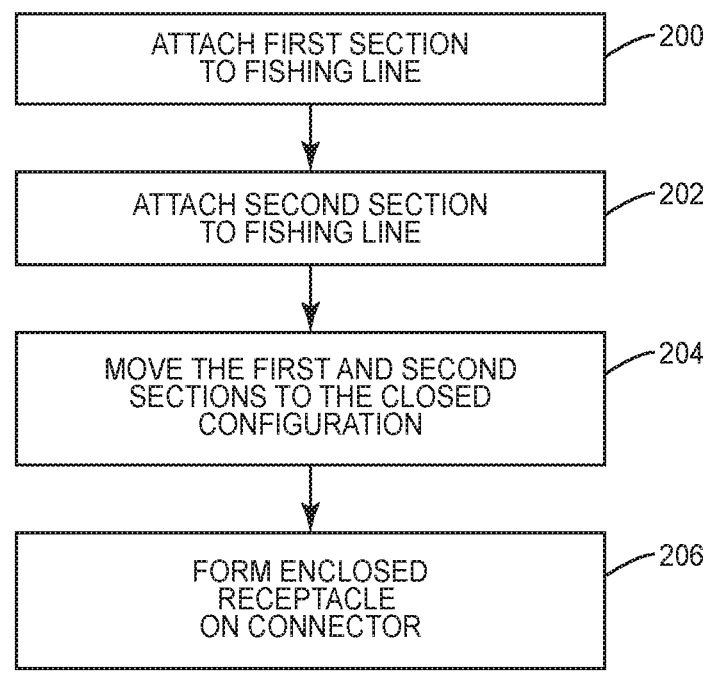
FIG. 9 is a flowchart diagram of a method of using a bait holder on a fishing line.

FIG. 9 illustrates one method of using a bait holder 10 on a fishing line 100. The method includes attaching a first section 20 to the fishing line 100 (block 200). This includes inserting the fishing line 100 into a gap 45 formed between a hook 40 and a post 41 that form a first connector section 11a. The fishing line 100 is inserted into the gap 45 and then moved into a slot 44 formed underneath the hook 40.

The second section 30 is attached to the fishing line 100 (block 202). This includes inserting the fishing line 100 into a gap 45 formed between a hook 40 and a post 41 that form the second connector section 11*b*. The fishing line 100 is inserted into the gap 45 and then moved into a slot 44 formed underneath the hook 40.

Bait attractor can be inserted into one or both of sections 20, 30. The first and second sections 20, 30 are then moved relative to each other to a closed configuration (block 204). This includes sliding the sections 20, 30 together and forming an enclosed interior space 14 that contains the bait attractor. The edges 28 of the sections 20, 30 can abut together. Further, one or more extensions 25 can be inserted to corresponding pockets 26 to further engage the sections 20, 30 together.

The attachment also aligns the hook 40 together in a side-by-side alignment along the fishing line 100 and forms an enclosed receptacle 50 that contains the fishing line 100 (block 206).

With the bait holder 10 attached to the fishing line 100, the fisherperson can place their bait and hook 101 as well as the bait holder 10 into the water. In one example, the bait holder 10 may move along the length of the fishing line 100 while in the water. The extent of movement along the fishing line 100 can be fixed by attaching objects to the fishing line 100, such as the hook 101 and a swivel or weight 102 (see FIG. 1). The person can then fish as normal while the bait holder 10 remains attached to the fishing line 100.

In the event new or additional bait attractor is needed, the person reels in the bait holder 10, detaches the first and second sections 20, 30 and moves then to the open configuration, placed bait attractor in one or both sections, 20, 30 and then reattaches the sections 20, 30 together. This process occurs without the sections 20, 30 having to be removed from the fishing line 100, and without having to cut the fishing line 100.

To remove the bait holder 10, the sections 20, 30 are moved to the open configuration. For each section 20, 30, the fishing line 100 is moved out of the slot 44 and to the gap formed between the hook 40 and post 41. The fishing line 100 is then removed from the gap 45 to detach the section 20, 30.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A bait holder configured to be attached to fishing line, the bait holder comprising: first and second sections each comprising: a cup-shaped body with a closed end and an open end; a connector section comprising a hook that extends outward from an outer side of the body with a slot formed between the hook and the outer side and with the slot comprising an opening at an end of the hook with the opening sized to receive the fishing line; the first and second sections configured to connect together with the open ends aligned together and forming an enclosed interior space within the bodies, and with the connector sections aligned together to form an enclosed receptacle to receive the fishing line; and the first and second sections are identical in shape and size; wherein each of the connector sections comprise a post that extends outward from the outer side of the body in proximity to the hook, the post being spaced away from the end of the hook by a gap that is sized to receive the fishing line.

2. The bait holder of claim 1, wherein the connector sections of the first and second sections are aligned within different planes that are parallel to each other and perpendicular to a longitudinal axis that extends through the enclosed interior space and the closed ends.

3. The bait holder of claim 1, further comprising an additional connector section positioned on an opposing side of each of the first and second sections.

4. The bait holder of claim 1, each of the first and second sections further comprise an edge at the open end with the edge of each of the first and second sections comprising one or more extensions and one or more pockets, the one or more extensions of each of the first and second sections sized to fit within the one or more pockets of the other of the first and second sections.

5. The bait holder of claim 4, wherein each of the edges comprise a stepped section and a recessed section that are aligned on different planes along a longitudinal axis that extends through the interior space, with the one or more extensions positioned on one of the stepped section and the recessed section and the one or more pockets positioned on the other of the stepped section and the recessed section.

6. A bait holder configured to be attached to fishing line, the bait holder comprising: a body comprising side walls and end walls that extend around and form an enclosed interior space, the body comprising a longitudinal axis that extends through the interior space and the end walls; first and second connectors that extend outward from the side walls and are each configured to connect to the fishing line, each of the first and second connectors comprising: a first hook with a first opening that extends into a first slot; a second hook with a second opening that extends into a second slot; the first and second hooks aligned in opposing directions with the first opening and the second opening facing in different directions and with the first and second slots aligned to form a receptacle to contain the fishing line; the body comprising first and second sections, each of the first and second sections comprising one-half of the body and one-half of the first and second connectors; and the first section is common in shape and size to the second section; wherein each of the first and second connectors further comprise a first post positioned at the first hook and a second position positioned at the second hook, each of the first and second posts are spaced away from the respective first and second hooks by a gap.

7. The bait holder of claim 6, wherein the first and second hooks are aligned in a side-by-side position along the longitudinal axis.

8. The bait holder of claim 6, wherein the first and second connectors are positioned on opposing sides of the body.

9. The bait holder of claim 6, wherein the body comprises a cylindrical shape with the end walls being rounded and with openings positioned in the end walls that lead into the interior space.

10. The bait holder of claim 6, further comprising a centerline C/L that is perpendicular to the longitudinal axis, wherein one of the first and second hooks of each of the connectors extends from the body on a first side of the centerline and the other of the first and second hooks extends from the body on an opposing second side of the centerline.

11. The bait holder of claim 10, wherein the body and the connectors are symmetrical about the centerline.

12. A method of using the bait holder of claim 6, the method comprising:
    attaching the first section of the bait holder to the fishing line by inserting the fishing line into a first gap formed between the first hook and a first post on the first section of the bait holder and moving the fishing line into the first slot formed underneath the first hook;
    attaching the second section of the bait holder to the fishing line by inserting the fishing line into a second gap formed between the second hook and a second post on the second section of the bait holder and moving the fishing line into the second slot formed underneath the second hook;
    moving each of the first and second sections along the fishing line and forming the enclosed interior space with the first and second sections; and
    aligning the first hook and the second hook together in a side-by-side alignment along the fishing line and forming the receptacle that contains the fishing line.

13. The method of claim 12, further comprising positioning the interior space away from the fishing line with the fishing line attached on an outer side of the interior space.

14. The method of claim 12, further comprising overlapping the first and second sections and forming the enclosed interior space and the enclosed receptacle.

15. The method of claim 12, further comprising aligning a longitudinal axis of the bait holder along the fishing line.

16. The method of claim 12, further comprising positioning bait within at least one of the first and second sections prior to forming the enclosed interior space.

17. The method of claim 12, further comprising abutting together edges of the first and second sections and forming the enclosed interior space.

* * * * *